(12) United States Patent
Hecht

(10) Patent No.: US 7,393,162 B2
(45) Date of Patent: Jul. 1, 2008

(54) GUN DRILL

(75) Inventor: Gil Hecht, Nahariya (IL)

(73) Assignee: Iscar Ltd., Tefen (IL)

( * ) Notice: Subject to any disclaimer, the term of this patent is extended or adjusted under 35 U.S.C. 154(b) by 343 days.

(21) Appl. No.: 11/202,348

(22) Filed: Aug. 12, 2005

(65) Prior Publication Data
US 2006/0039766 A1 Feb. 23, 2006

(30) Foreign Application Priority Data
Aug. 23, 2004 (IL) ..................... 163679

(51) Int. Cl.
B23B 41/02 (2006.01)
(52) U.S. Cl. ............ 408/1 R; 408/59; 408/200; 408/229; 408/231; 408/233; 408/705; 408/713
(58) Field of Classification Search ............ 408/57, 408/59, 199, 200, 227, 229, 230, 231, 233, 408/705, 713, 1 R, 731
See application file for complete search history.

(56) References Cited

U.S. PATENT DOCUMENTS

| 2,346,546 | A |   | 4/1944  | Anderson |            |
|-----------|---|---|---------|----------|------------|
| 3,153,356 | A |   | 10/1964 | Dearborn |            |
| 3,304,816 | A |   | 2/1967  | Galomeau |            |
| RE26,452  | E |   | 9/1968  | Dearborn |            |
| 4,437,802 | A | * | 3/1984  | Hall, Jr. ................ | 408/197 |
| 5,971,673 | A | * | 10/1999 | Berglund et al. ......... | 408/1 R |
| 5,988,953 | A | * | 11/1999 | Berglund et al. ......... | 408/1 R |
| 6,059,492 | A | * | 5/2000  | Hecht ................ | 408/144 |
| 6,276,879 | B1 | * | 8/2001 | Hecht ................ | 409/234 |
| 6,506,003 | B1 | * | 1/2003 | Erickson ............ | 408/226 |
| 6,582,164 | B1 | * | 6/2003 | McCormick ......... | 408/226 |
| 6,626,614 | B2 |   | 9/2003 | Nakamura |            |
| 7,004,691 | B2 | * | 2/2006 | Nomura ............ | 408/59 |
| 2006/0072976 | A1 | * | 4/2006 | Frota de Souza ...... | 408/230 |
| 2006/0093449 | A1 | * | 5/2006 | Hecht et al. ......... | 408/231 |

FOREIGN PATENT DOCUMENTS

SU 1757785 A1 * 8/1992

* cited by examiner

Primary Examiner—David P. Bryant
Assistant Examiner—Michael W Talbot
(74) Attorney, Agent, or Firm—Womble Carlyle

(57) ABSTRACT

A gun-drill comprises a cutting-head detachably secured to a shank, having a common longitudinal axis and comprising mating peripheral surfaces. A shank coupling portion comprises a forwardly tapering shank fixation surface is formed at a front end of the shank, and a cutting-head coupling portion comprising a forwardly tapering cutting-head fixation surface is formed at a rear end of the cutting-head. Both the shank and the cutting-head coupling portion extend over a peripheral coupling angle φ of more than 180°. The shank and the cutting-head are assembled by positioning the cutting-head leading face in front of the shank trailing face, slidably inserting the cutting-head coupling portion into the shank coupling portion laterally to the axis of rotation A and rotating the cutting-head relative to the shank in a direction opposed to the direction of rotation R so that the cutting-head coupling portion and the shank coupling portion interlock co-axially.

28 Claims, 13 Drawing Sheets

GUN DRILL

FIELD OF THE INVENTION

The present invention relates to a gun-drill assembly having a detachably secured cutting-head, and a single, straight flute.

BACKGROUND OF THE INVENTION

U.S. Pat. No. 3,304,816 discloses a multi-section drill, separable from its driving means, which uses a coupling mechanism of a mating undercut arrangement in the form of a helix on corresponding male and female ends of the sections to coaxially join the sections together, detachably securing a cutting-head (driven section) in a shank (driving section) of the drill. The driving section (shank) comprises a hollow cylindrical sleeve on a driving end thereof; an undercut in the sleeve in coaxial relationship therewith; two non-parallel edge surfaces on the undercut, one edge having a helix thereon, while the other surface is flat throughout its full length and perpendicular to the rotational axis of the tool; and a back taper on the helix. The driven section (cutting-head) comprises a generally cylindrical body, an undercut on the body forming a cylindrical section thereon; an enlarged coaxial flange on the cylindrical section; two non-parallel edge surfaces on the enlarged flange, one edge having a helix thereon, while the other surface is flat throughout its full length and perpendicular to the rotational axis of the tool; and a back taper on the helix. Cooperation of the flange on the cutting-head and the undercut in the shank forms a compound locking and driving means, as the flange is firmly engaged between the two non-parallel surfaces of the driving portion, while the cylindrical surface of the cutting-head is piloted in the hollow sleeve of the driving portion, so that the two flute surfaces on the driving portion and the cutting-head are mutually aligned.

In order to achieve positive lock together with accurate rotational positioning, the mating surfaces of '816 must be ground to exacting tolerances. However, even if these surfaces are initially precisely fitted, deformation during work may cause dimensional variations, and because there is no definite rotational stop to prohibit over rotation, the parts can rotate relative to each other, especially under working loads, thereby losing their rotational alignment, leading to over-tightening, difficulty in removing the tip, and disturbance to the flow of fluid and chips.

Additionally, since the cutting-head is inserted into the driving section, a clearance fit has to exist between the cylindrical surface of the cutting-head and the hollow sleeve of the driving section, thereby preventing precise axial alignment between the two parts.

U.S. Pat. Nos. 3,153,356 and Re. 26,452 disclose a multi-section gun-drill tool in which the tool may be extended by threading sections coaxially together; the threads are helical in form with a specified helix angle range for locking the male and female threads to each other as the means for coaxially aligning the tool sections. A front shoulder of the cutting-head cooperates with an abutment on the shank, with the tolerances between these two surfaces being exceedingly important, since they limit the turning of the cutting-head threads into the threaded counter-bore of the shank. However, lack of positive stopping and torque-transmitting means can cause the problems mentioned above, i.e., loss of rotational alignment, over-tightening, difficulty in removing the tip, and disturbance to the flow of fluid and chips. Additionally, since axial alignment of the cutting-head and the shank relies on the exacting tolerances between the shoulder of the cutting-head and the abutment on the shank, precise axial alignment between the two parts is difficult to achieve.

Another example of detachable tip gun-drill is disclosed in U.S. Pat. No. 2,346,546 which shows an arrangement for extending the length of the tool by slip fitting a formed male section into a correspondingly sized and shaped female section. Positive torque-transmission and rotational alignment are achieved through a cross-pin which is inserted transversely to the axis of rotation of the gun-drill, into cross-bores passing through the tip and the shank. However, cutting-heads (or tips) made of exceptionally hard materials, such as ceramics or sintered hard metal composition, are difficult and expensive to cross-drill. Additionally, such pins complicate installation and replacement of the cutting-head in the shank.

U.S. Pat. No. 5,971,673 discloses a twist drill having a detachable cutting tip, the drill having fluid conduits extending through the tool body and the cutting tip. To connect the cutting portion to the tool body, the cutting portion and tool body are converged longitudinally so that the projections enter the front flutes. Then, the cutting portion is rotated relatively to the tool body, to align the front flutes with the rear flutes while causing the projections to enter the recesses and form therewith a bayonet, with a support surface of the cutting tip abutting a front surface of the tool body. However, the drill disclosed in '673 cannot provide sufficient axial and lateral support required by gun-drills, where the cutting tip must support and guide the shank, aligning it both axially and laterally, to assure drilling a straight bore. Furthermore, the connection method disclosed in '673 cannot be applied to cutting-tools having a single flute.

It is an object of the present invention to provide a single fluted gun-drill having a detachably secured cutting-head that significantly reduces or overcomes the aforementioned disadvantages, while facilitating quick and simple replacement of the cutting-head.

SUMMARY OF THE INVENTION

In accordance with the present invention there is provided a gun-drill having a longitudinal axis of rotation A defining a front-to-rear direction and a direction of rotation R. The gun-drill comprises a cutting-head detachably secured to a shank. The cutting-head comprises a cutting-head cutting portion adjacent a cutting-head front end and a cutting-head coupling portion adjacent a cutting-head rear end. The cutting-head coupling portion comprises an axially rearwardly facing cutting-head support surface. The shank comprises a shank coupling portion formed at a shank forward end. The shank coupling portion comprises an axially forwardly facing shank support surface. The cutting-head coupling portion comprises a forwardly disposed generally frustoconical cutting-head fixation surface tapering radially inwardly while extending forwardly. The cutting-head fixation surface extends peripherally continuously from the cutting-head flute leading face to the cutting-head flute trailing face over a cutting-head peripheral angle $\phi_C$ greater than 180°. The shank coupling portion comprises a forwardly disposed generally frustoconical shank fixation surface tapering radially inwardly while extending forwardly. The shank fixation surface extends peripherally continuously from the shank flute leading face to the shank flute trailing face over a shank peripheral angle $\phi_S$ greater than 180°. In a secured position, the cutting-head and shank coupling portions interlock co-axially, with the cutting-head support surface abutting the shank support surface, so that cutting-head and shank peripheral surfaces and cutting-head and shank leading and trailing faces mate and are co-aligned.

If desired, the gun-drill may be provided with a fluid conduit, which extends axially through the shank and the cutting-head, the fluid conduit comprises shank and cutting-head conduits, the shank and the cutting-head conduits comprise shank and cutting-head conduit inner walls; the shank and the cutting-head conduit inner walls being matching and aligned when the cutting-head is in the secured position in the shank. The cutting-head and shank conduit inner walls meet the abutting cutting-head and shank support surfaces at cutting-head and shank conduit apertures, respectively, so that, in the secured position, the cutting-head and shank conduit apertures overlap.

Generally, the cutting-head peripheral angle $\phi_C$ is substantially equal to the shank peripheral angle $\phi_S$.

Preferably, the cutting-head peripheral angle $\phi_C$ and the shank peripheral angle $\phi_S$ are smaller than 270°, Further preferably, the cutting-head peripheral angle $\phi_C$ and the shank peripheral angle $\phi_S$ are between 220° and 250°.

Yet further preferably, the cutting-head peripheral angle $\phi_C$ and the shank peripheral angle $\phi_S$ are 235°.

Typically, the cutting-head and the shank support surfaces are flat and perpendicular to the axis of rotation A.

If desired, the cutting-head coupling portion may comprise a cutting-head cylindrical surface extending axially away from the cutting-head fixation surface and peripherally continuously from the cutting-head leading face to the cutting-head trailing face, and the shank coupling portion comprises a shank cylindrical surface extending axially away from the shank fixation surface and peripherally continuously from the shank leading face to the shank trailing face.

Typically, when the cutting-head is secured to the shank, a first gap extends continuously circumferentially between the cutting-head cylindrical surface and the shank cylindrical surface; and a second gap exists between the cutting-head and the shank intermediate surfaces.

Generally, the cutting-head coupling portion comprises a cutting-head stop member having a cutting-head stop wall facing away from the direction of rotation R and extending generally axially forwardly away from the cutting-head coupling wall, and the shank coupling portion comprising a shank stop member having a shank stop wall facing the direction of rotation R and extending generally axially forwardly away from the shank coupling wall. The cutting-head stop member comprises a generally radially outwardly facing cutting-head cylindrical wall and an axially rearwardly facing cutting-head top wall, and the shank stop member comprises a generally radially inwardly facing shank cylindrical wall and an axially forwardly facing shank top face.

Preferably, in the secured position, the cutting-head stop wall and the shank stop wall abut.

Further preferably, in the secured position, a third gap exists between the cutting-head cylindrical wall and the shank cylindrical wall.

Yet further preferably, a fourth gap exists between the cutting-head top face and the shank top face.

If desired, an axially rearwardly facing cutting-head intermediate surface is located between the cutting-head fixation surface and the cutting-head peripheral surface, and an axially forwardly facing shank intermediate surface is located between the shank fixation surface and the shank peripheral surface. When the cutting-head is secured in the shank, a second gap exists between the cutting-head and shank intermediate surfaces.

Alternatively, in the secured position, a rear gap exists between a generally axially rearwardly facing cutting-head rear surface disposed adjacent the cutting-head cylindrical surface and a generally axially forwardly facing shank rear surface disposed adjacent the shank cylindrical surface.

A method of assembling the gun-drill in accordance with the present invention comprises the steps of radially slidably positioning the cutting-head and the shank with the cutting-head flute leading face facing the shank trailing face; slidably inserting the cutting-head coupling portion into the shank coupling portion until a contact is formed between the cutting-head fixation surface and the shank fixation surface; and rotating the cutting-head relative to the shank in a direction opposed to the direction of rotation R to the secured position, until the cutting-head fixation surface abuts the shank fixation surface and the cutting-head stop wall abuts the shank stop wall.

BRIEF DESCRIPTION OF THE DRAWINGS

For a better understanding of the present invention and to show how the same may be carried out in practice, reference will now be made to the accompanying drawings, in which.

DETAILED DESCRIPTION OF PREFERRED EMBODIMENTS

Figure 1:
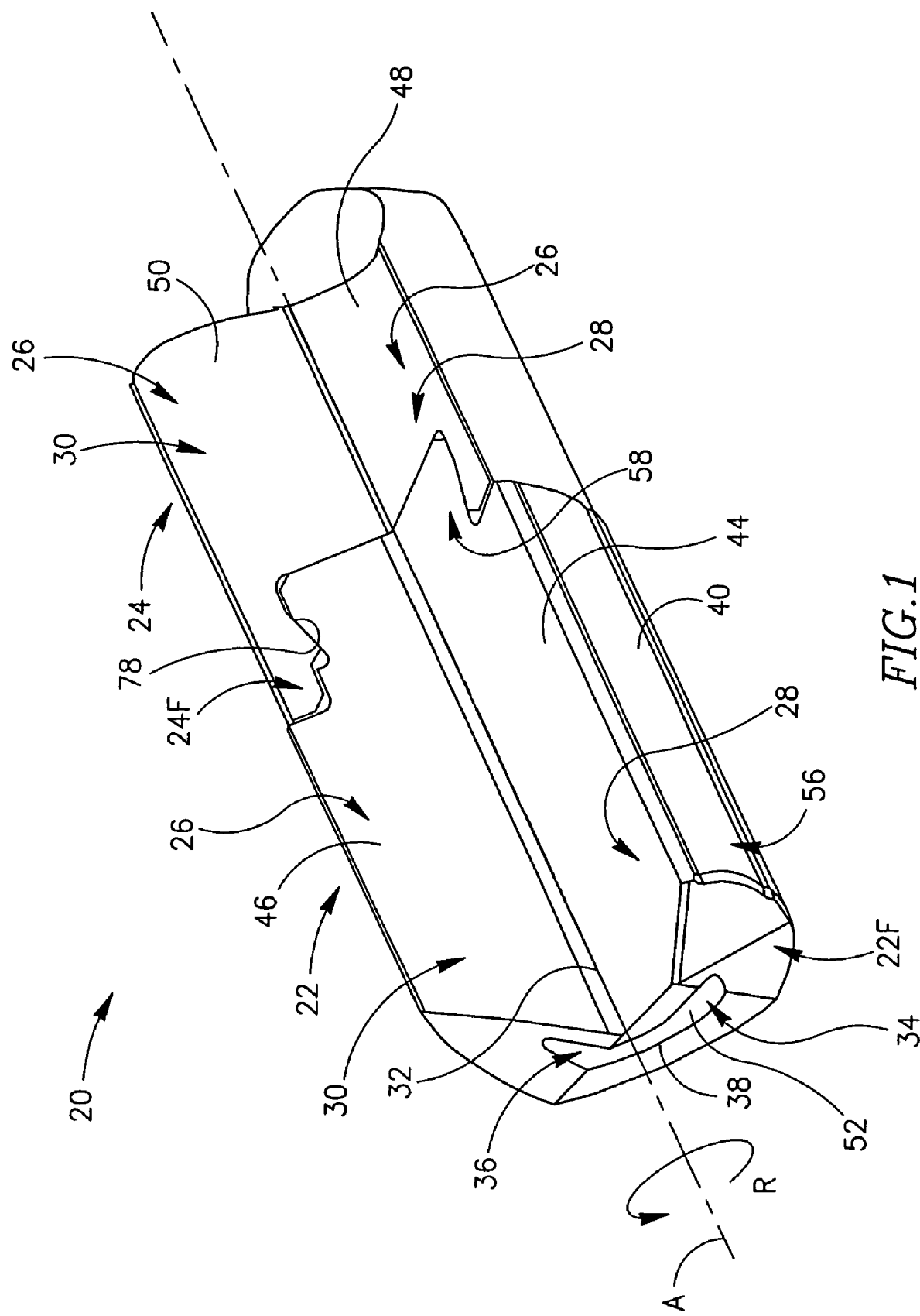
FIG. 1 is a perspective view of a gun-drill in accordance with a first embodiment of the present invention, with a cutting-head mounted in a shank in a secured position.
Figure 2:
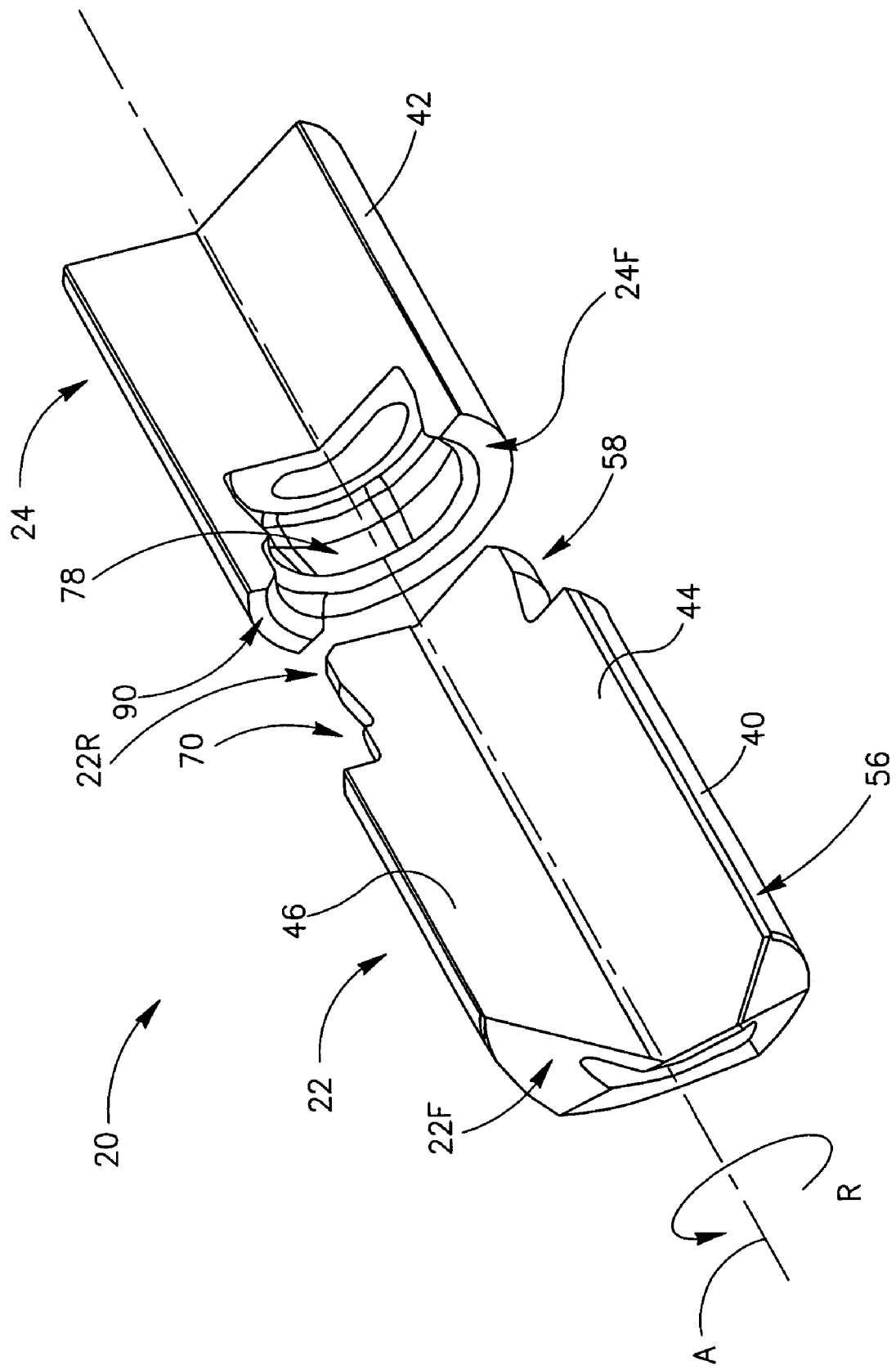
FIG. 2 is an exploded perspective view of the gun-drill shown in FIG. 1.
Figure 3:
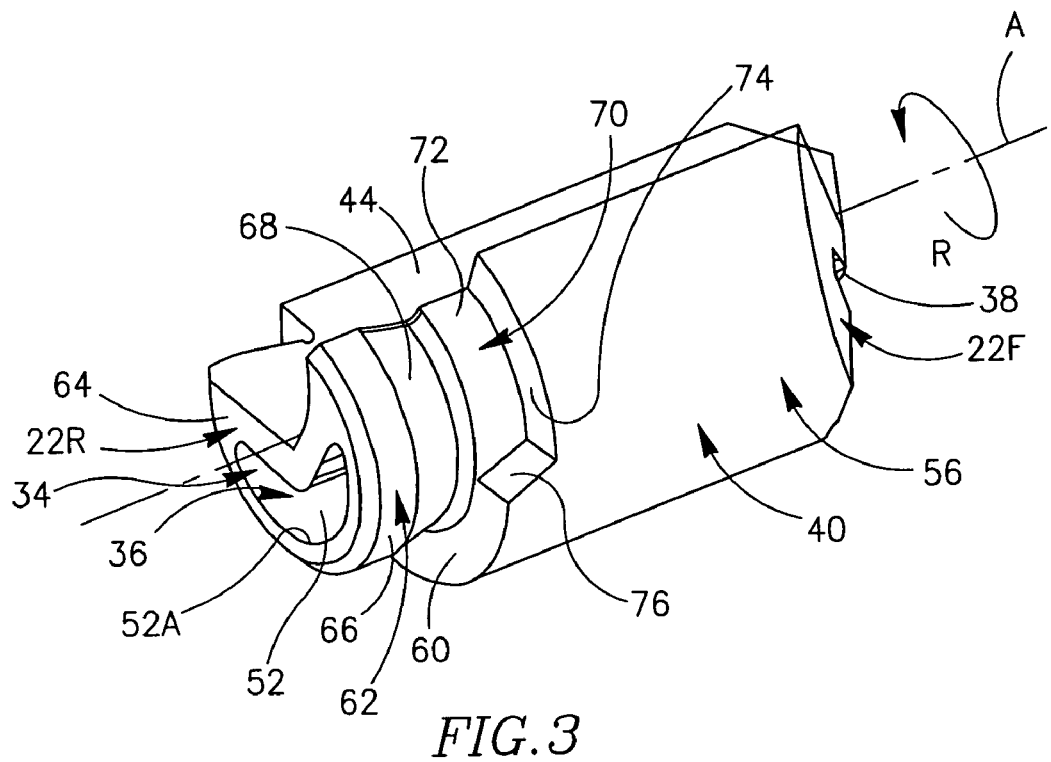
FIG. 3 is a rear perspective view of the cutting-head of the gun-drill shown in FIG. 2, showing a cutting-head coupling portion.

A gun-drill 20 in accordance with a first embodiment of the present invention is shown in FIG. 1. The gun-drill 20 has a direction of rotation R around a longitudinal axis of rotation A defining a front-to-back direction, and comprises a cutting-head 22 detachably secured to a shank 24 at a shank forward end $24_F$. A single, straight flute 26 extends axially along the shank 24 and the cutting-head 22, and comprises leading and trailing faces 28, 30, disposed at a flute angle to each other. The flute leading and trailing faces 28, 30 meet at a flute apex 32 adjacent the axis of rotation A. The gun-drill 20 further comprises a fluid conduit 34 extending axially therethrough, comprising a conduit inner wall 36 and a fluid discharge outlet 38 at a cutting-head forward end $22_F$. When the cutting-head 22 is mounted in an operational, secured position in the shank 24, cutting-head and shank peripheral surfaces 40, 42, cutting-head and shank leading and trailing faces 44, 48, 46, 50, and cutting-head and shank conduit inner walls 52, 54, mate and are co-aligned.

Attention is now drawn to FIGS. 2 to 5. The cutting-head 22 comprises a cutting portion 56 adjacent the cutting-head forward end $22_F$ and a cutting-head coupling portion 58 adjacent a cutting-head rear end $22_R$ thereof. The cutting portion 56 may comprise cutting geometries of any appropriate design. The cutting-head coupling portion 58 has a rearwardly facing cutting-head intermediate surface 60 which extends circumferentially from the cutting-head leading face 44 to the cutting-head trailing face 46 and radially inwardly from the cutting-head peripheral surface 40 to a cutting-head coupling wall 62. The cutting-head coupling wall 62 extends continuously circumferentially from the cutting-head leading face 44 to the cutting-head trailing face 46 and rearwardly away from the cutting-head intermediate surface 60 towards a rearwardly facing cutting-head support surface 64. The cutting-head conduit inner wall 52 meets the cutting-head support surface 64 at a cutting-head conduit aperture $52_A$.

Figure 4:
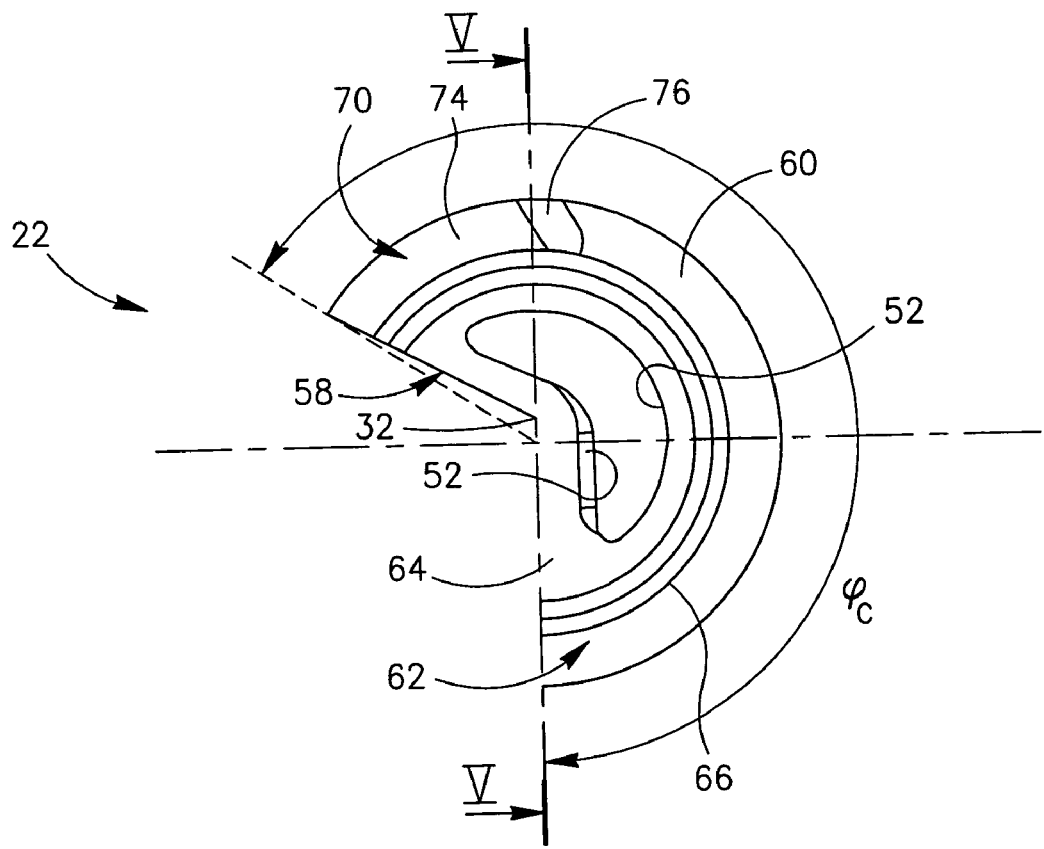
FIG. 4 is a rear view of the cutting-head shown in FIG. 3.
Figure 5:
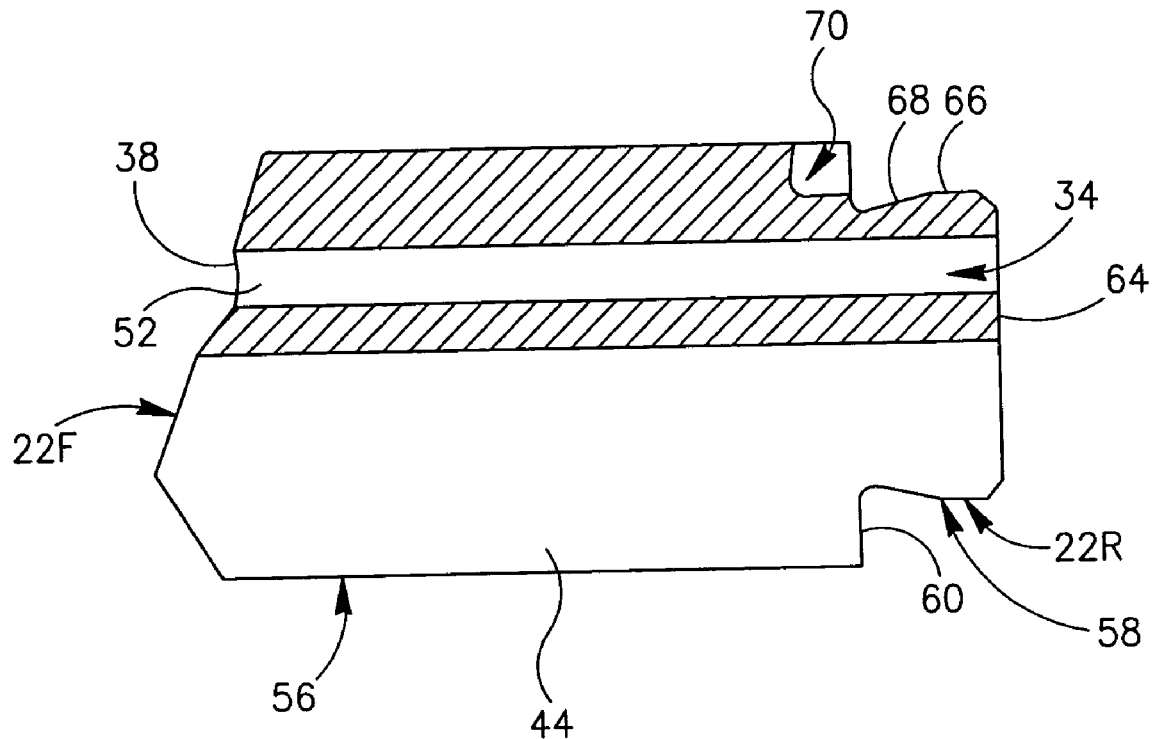
FIG. 5 is a cross-section view of the cutting-head taken along the line V-V in FIG. 4.
Figure 6:
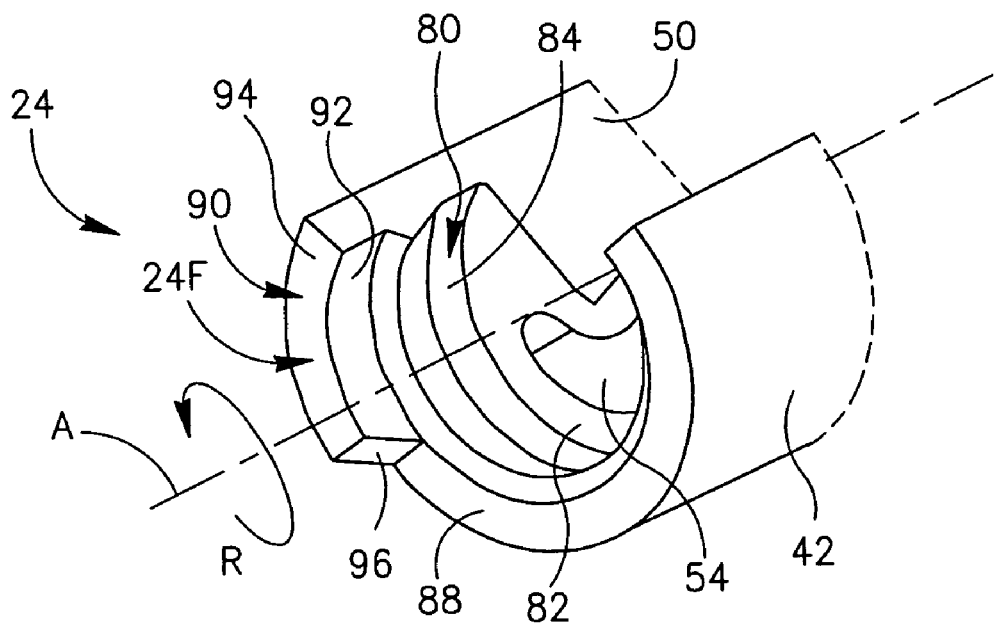
FIG. 6 is a front perspective view of the shank of the gun-drill shown in FIG. 2.

The cutting-head coupling wall 62 comprises a rearwardly disposed cutting-head cylindrical surface 66 adjacent the cutting-head support surface 64, and a forwardly disposed generally frustoconical cutting-head fixation surface 68 extending axially forwardly while tapering radially inwardly from the cutting-head cylindrical surface 66 towards the cutting-head intermediate surface 60. As a consequence, the cutting-head fixation surface 68 has an axial cross-section that decreases in a forward direction of the cutting head. As best shown in FIG. 4, the cutting-head coupling wall 62 extends continuously circumferentially along a cutting-head peripheral coupling angle $\phi_C$ which is greater than 180°. Generally, the cutting-head peripheral coupling angle $\phi_C$ is between 210° and 270°, and more commonly between 220° and 260°. In accordance with a specific embodiment, the cutting-head peripheral coupling angle $\phi_C$ is approximately 235°.

The cutting-head coupling portion 58 further comprises a cutting-head stop member 70 in a form of a recess in a rear portion of the cutting-head peripheral surface 40. The cutting-head stop member 70 is bounded by three surfaces: a generally radially outwardly facing cutting-head cylindrical wall 72, a generally axially rearwardly facing cutting-head top face 74, and a flat cutting-head stop wall 76 which faces generally tangentially away from the direction of rotation R while extending generally axially forwardly from the cutting-head intermediate surface 60 to the cutting-head top face 74 and generally radially outwardly from the cutting-head cylindrical wall 72 to the cutting-head peripheral surface 40. The cutting-head stop member 70 opens tangentially to the cutting-head trailing face 46, axially rearwardly to the cutting-head intermediate surface 60, and radially outwardly to the cutting-head peripheral surface 40.

Attention is now drawn to FIGS. 2 and 6 to 8. A shank coupling portion 78 is located at the shank forward end $24_F$ and comprises a shank coupling wall 80 which extends continuously circumferentially from a shank leading face 48 to a shank trailing face 50 of the flute 26 and rearwardly towards a forwardly facing shank support surface 82. The shank conduit inner wall 54 meets the shank support surface 82 at a shank conduit aperture $54_A$.

The shank coupling wall 80 comprises a rearwardly disposed shank cylindrical surface 84 extending in a direction away from the shank support surface 82, and a forwardly disposed generally frustoconical shank fixation surface 86 extending axially forwardly while tapering radially inwardly from the shank cylindrical surface 84 towards a forwardly facing shank intermediate surface 88. As a consequence, the shank fixation surface 86 has an axial cross-section that decreases in a forward direction of the shank. A shank stop member 90 extends away from the shank intermediate surface 88, and comprises a generally radially inwardly facing shank cylindrical wall 92 which extends from the shank fixation surface 86 to a forwardly facing shank top face 94. A flat shank stop wall 96 facing generally tangentially in the direction of rotation R extends generally axially forwardly from the shank intermediate surface 88 to the shank top face 94 and generally radially outwardly from the shank cylindrical wall 92 to the shank peripheral surface 42. The shank intermediate surface 88 extends radially outwardly away from the shank fixation surface 86 to the shank peripheral surface 42 and continuously angularly from the shank leading face 48 of the flute 26 to the shank stop wall 96, while the shank stop member 90 extends angularly from the shank stop wall 96 to the shank trailing face 48 of the flute 26.

Figure 7:
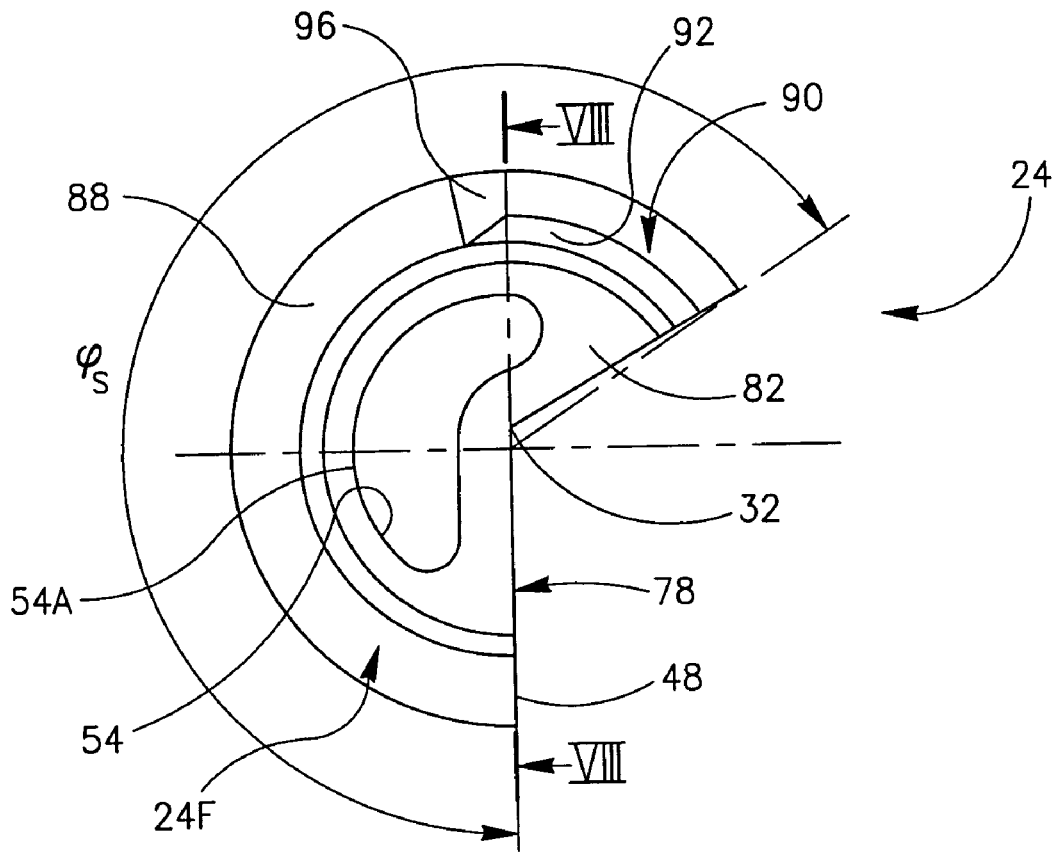
FIG. 7 is a front axial view the shank shown in FIG. 6.
Figure 8:
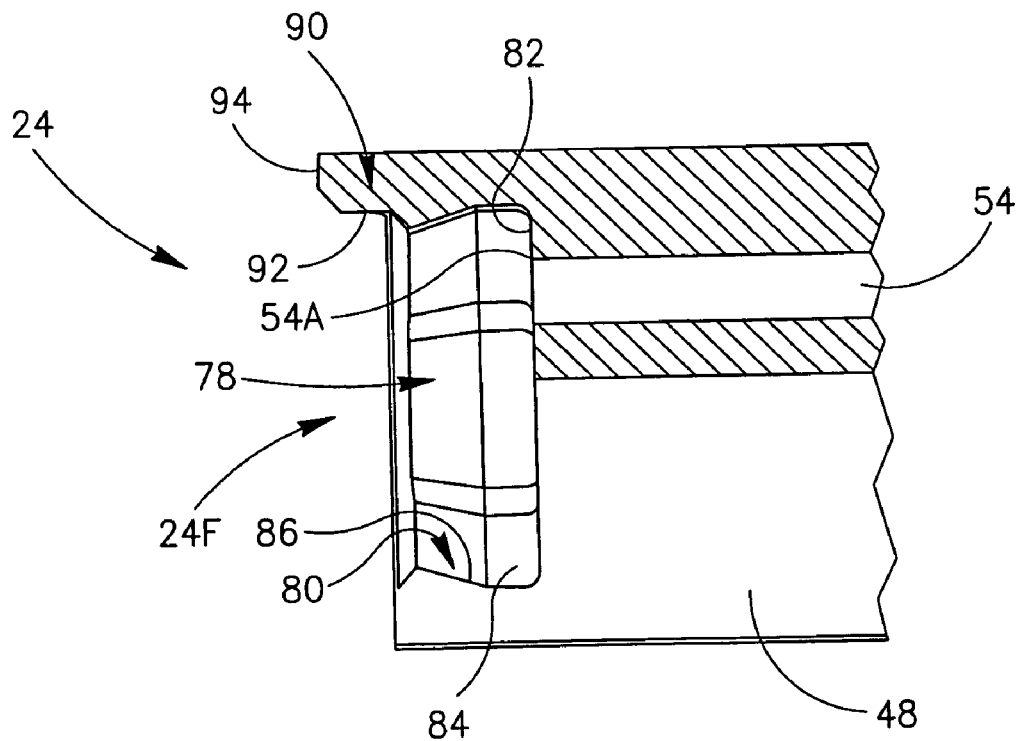
FIG. 8 is a partial cross-section view of the shank, taken along the line VIII-VIII in FIG. 7.

As is better shown in FIG. 7, both the shank peripheral surface 42 and the shank coupling wall 80 extend continuously angularly over a shank peripheral angle $\phi_S$ which is substantially equal to the cutting-head peripheral coupling angle $\phi_C$.

Figure 9:
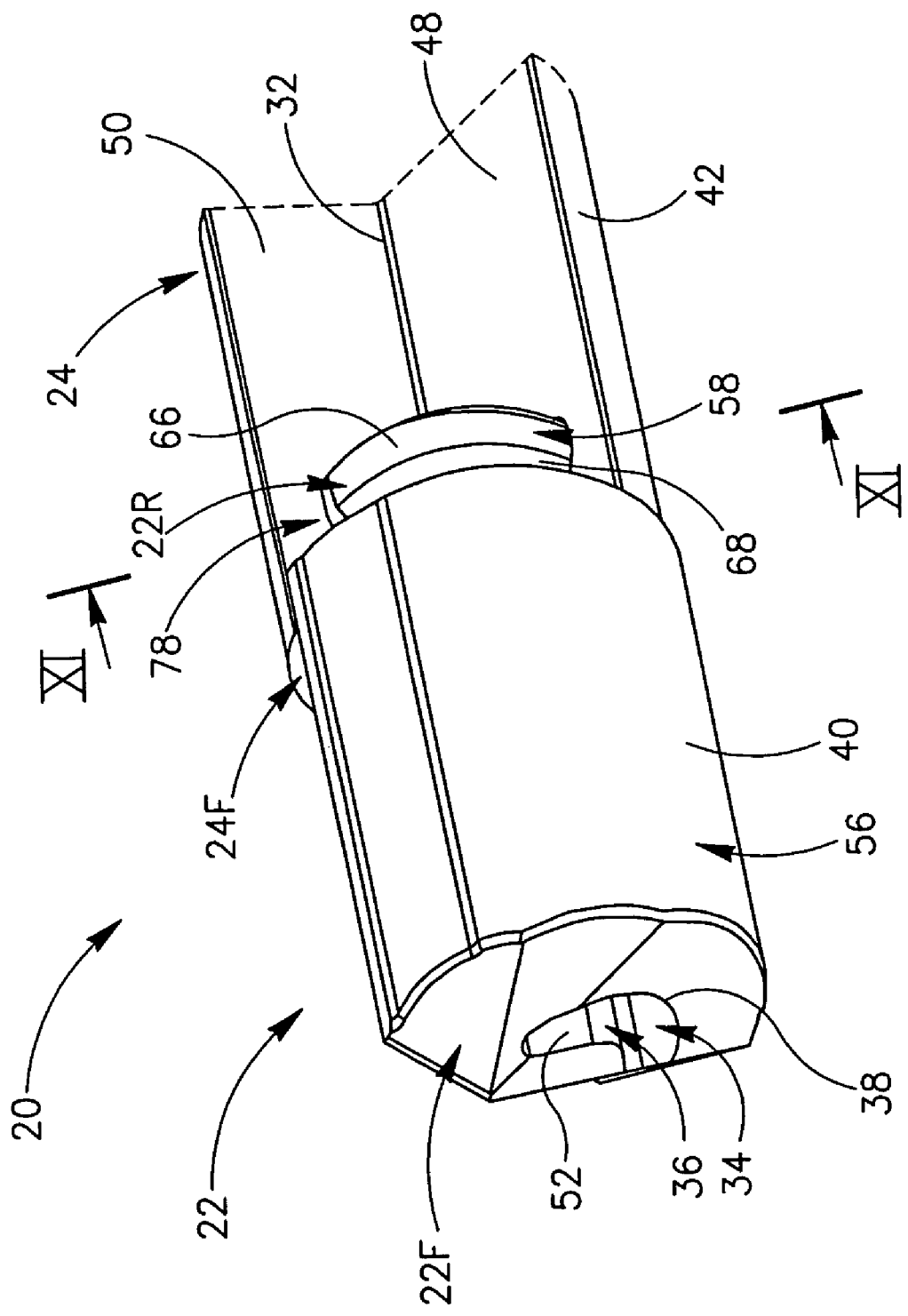
FIG. 9 is a perspective view of the cutting-head and the shank shown in FIGS. 1 and 2, in a released position.
Figure 10:
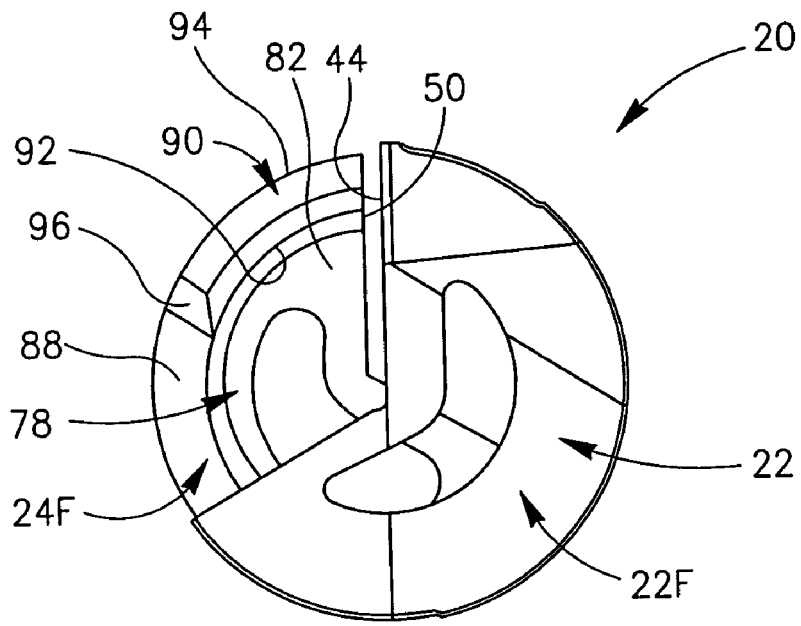
FIG. 10 is a front view of the cutting-head and the shank shown in FIG. 9.
Figure 11:
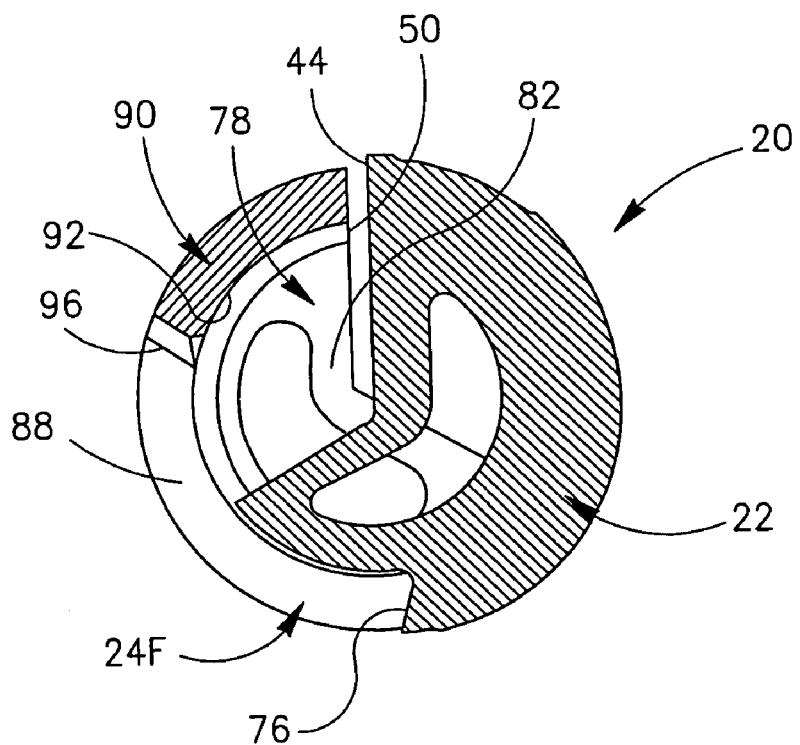
FIG. 11 is an axial cross-section view of the cutting-head and the shank taken along the plane XI-XI in FIG. 9.
Figure 12:
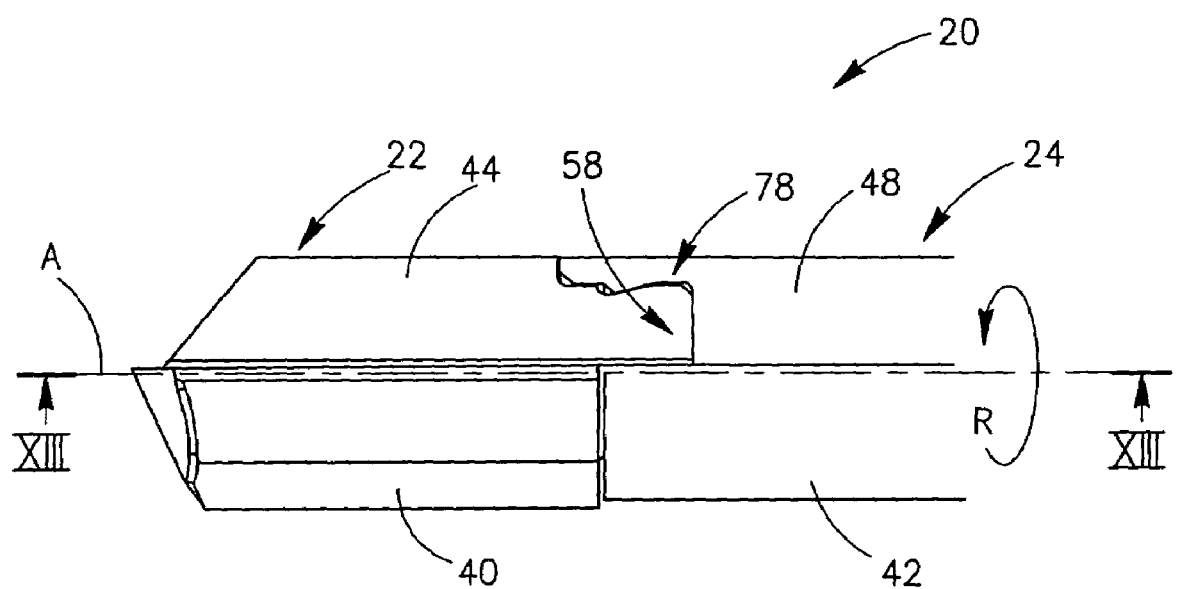
FIG. 12 is a side view of the gun-drill shown in FIG. 1, showing the cutting-head and shank in the secured position.

Attention is now drawn to FIGS. 9 to 11. Securing the cutting-head 22 to the shank 24 is accomplished by positioning the cutting-head 22 with the cutting-head leading face 44 facing the shank trailing face 50 and the cutting-head coupling portion 58 adjacent the shank coupling portion 78, and sliding the cutting-head coupling portion 58 into the shank coupling portion 78 until the cutting-head fixation surface 68 abuts the shank fixation surface 86, to a released position of the cutting-head 22. Rotation of the cutting-head 22 relative to the shank 24 against the direction of rotation R of the gun-drill 20 positions the cutting-head 22 in the secured position shown in FIGS. 1 and 12, with the shank coupling portion 78 fully enveloping the cutting-head coupling portion 58. To remove the cutting-head 22 from the shank 24, the cutting-head 22 is rotated relative to the shank 24 in the direction of rotation R to the released position. From the released position, the cutting-head 22 can be removed from the shank 24, and a new cutting-head 22 can then secured to the shank 24.

Figure 13:
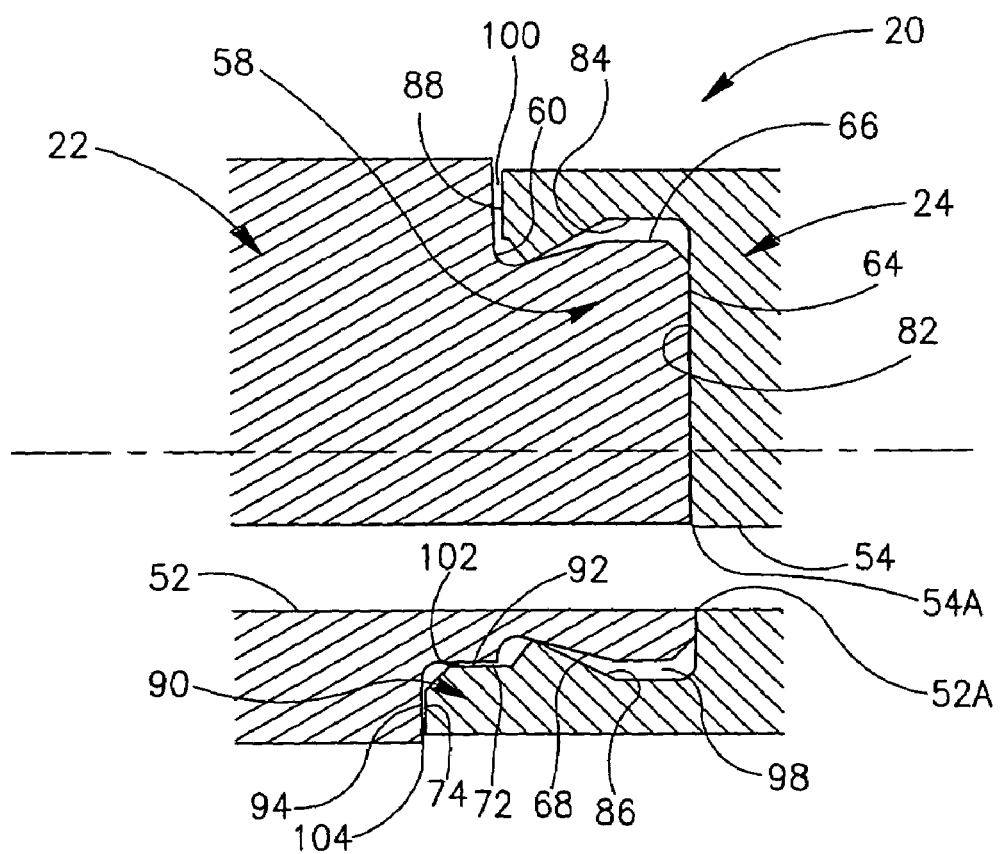
FIG. 13 is an enlarged cross-section taken along the line XIII-XIII in FIG. 12, showing in detail the cutting-head and shank coupled in the secured position.

As the cutting-head 22 is rotated in the shank 24 from the released position to the secured position, the shank fixation surface 86 urges the cutting-head fixation surface 68 axially rearwardly, so that the cutting-head support surface 64 abuts the shank support surface 82, to positively and accurately position the cutting-head 22 in the shank 24. In the secured position, the shank conduit aperture $54_A$ and the cutting-head conduit aperture $52_A$ overlap, so that the cutting-head and shank conduit inner walls 52, 54 mate and co-align, thereby facilitating coolant flow through the shank 24 and the cutting-head 22 to the fluid discharge outlet 38. As shown in FIG. 13, the cutting-head fixation surface 68 and the shank fixation surface 86 interlock co-axially, to provide self-clamping and self-centering of the cutting-head 22 in the shank 24. Because both the cutting-head coupling portion 58 and the shank coupling portion 78 extend continuously circumferentially through the peripheral angles $\phi_C$, $\phi_S$, respectively, which are greater than 180°, the shank fixation surface 86 urges the coupling-head 22 to axially align with the shank 24. Positive rotational location and alignment of the cutting-head 22 and the shank 24 are achieved by the cutting-head stop wall 76 abutting the shank stop wall 96, facilitating torque transmission from the shank 24 to the cutting-head 22. In the secured position, a first gap 98 extends circumferentially between the cutting-head cylindrical surface 66 and the shank cylindrical surface 84, a second gap 100 exists between the cutting-head intermediate surface 60 and the shank intermediate surface 88, a third gap 102 exists between the cutting-head cylindrical wall 72 and the shank cylindrical wall 92, and a fourth gap 104 exists between the cutting-head top face 74 and the shank top face 94.

Figure 14:
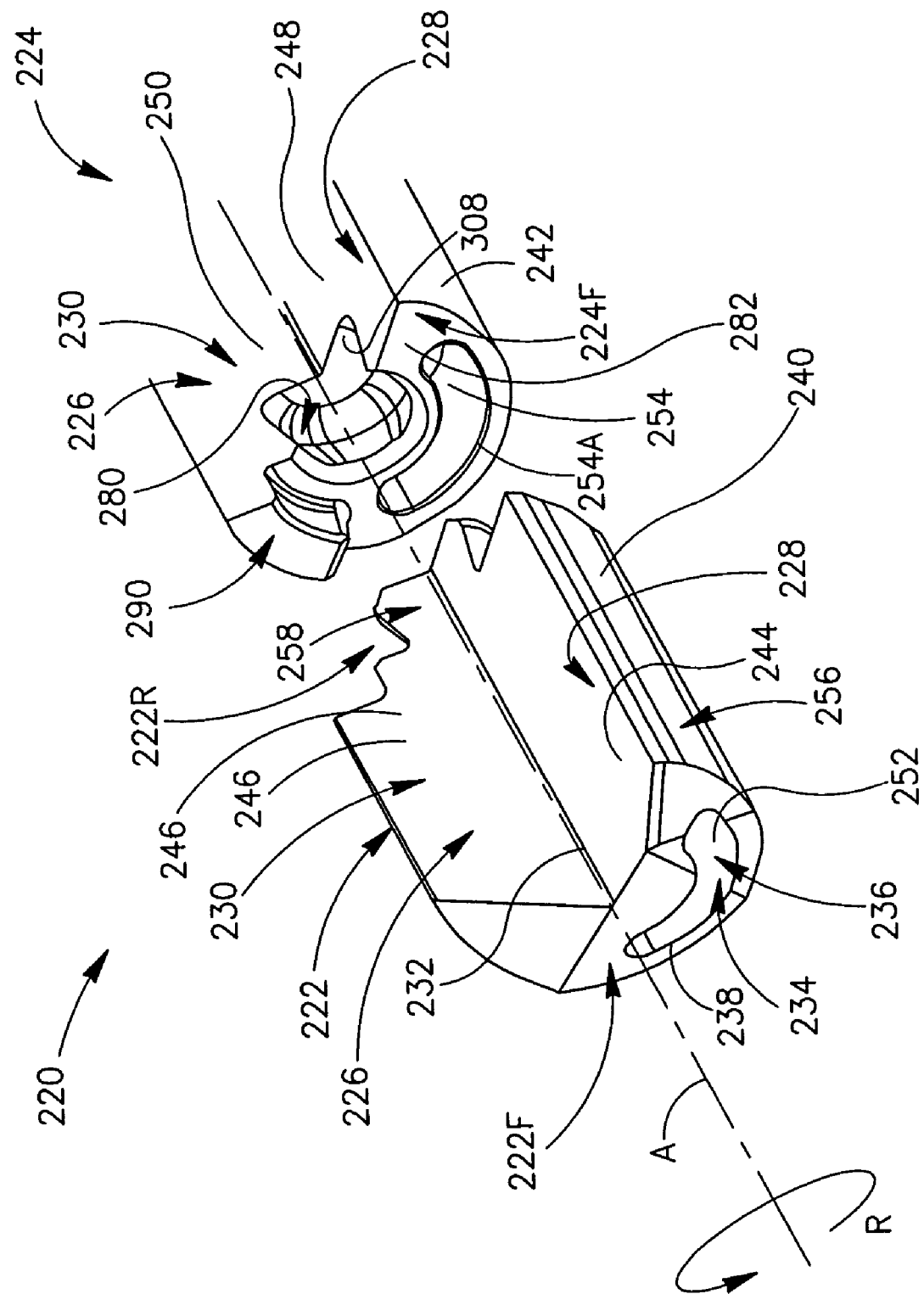
FIG. 14 is an exploded perspective view of a gun-drill in accordance with a second embodiment the present invention.

Attention is now directed to FIG. 14 showing a gun-drill 220 in accordance with a second embodiment of the present invention. Since the gun-drill 220 in accordance with the second embodiment has many features which are similar to those of the gun-drill 20 in accordance with the first embodiment, the similar features of the gun-drill 220 in accordance with the second embodiment will be referred to herein below by reference numerals which are shifted by 200 from those of the gun-drill 20 in accordance with the first embodiment.

The gun-drill 220 in accordance with the second embodiment has an axis of rotation A and a direction of rotation R defined much in the same manner as the axis of rotation A and a direction of rotation R of the gun-drill 20 in accordance with one embodiment. The gun-drill 220 has a cutting-head 222 detachably secured to a shank 224 at a shank forward end $224_F$. Both the shank 224 and the cutting-head 222 have a single, straight flute 226 extending axially along the shank 224 and the cutting-head 222. The flute has leading and trailing faces 228, 230 meeting at a flute apex 232 adjacent the axis of rotation A. A fluid conduit 234 having a conduit inner wall 236 and a fluid discharge outlet 238 formed at a cutting-head forward end $222_F$ extends axially through the gun-drill 220. When the cutting-head 222 is mounted in an operational, secured position in the shank 224, cutting-head and shank peripheral surfaces 240, 242, cutting-head and shank leading and trailing faces 244, 248, 246, 250, and cutting-head and shank conduit inner walls 252, 254, mate and are co-aligned.

Figure 15:
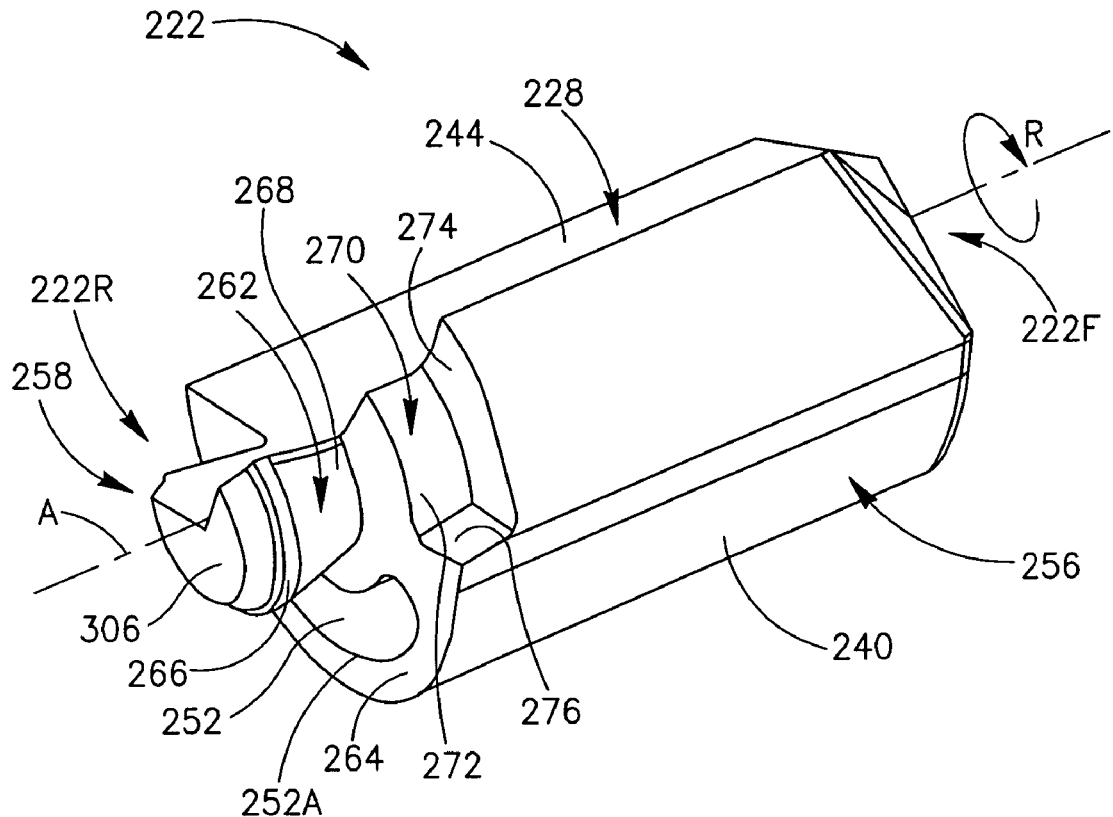
FIG. 15 is a rear perspective view of a cutting-head of the gun-drill shown in FIG. 14.
Figure 16:
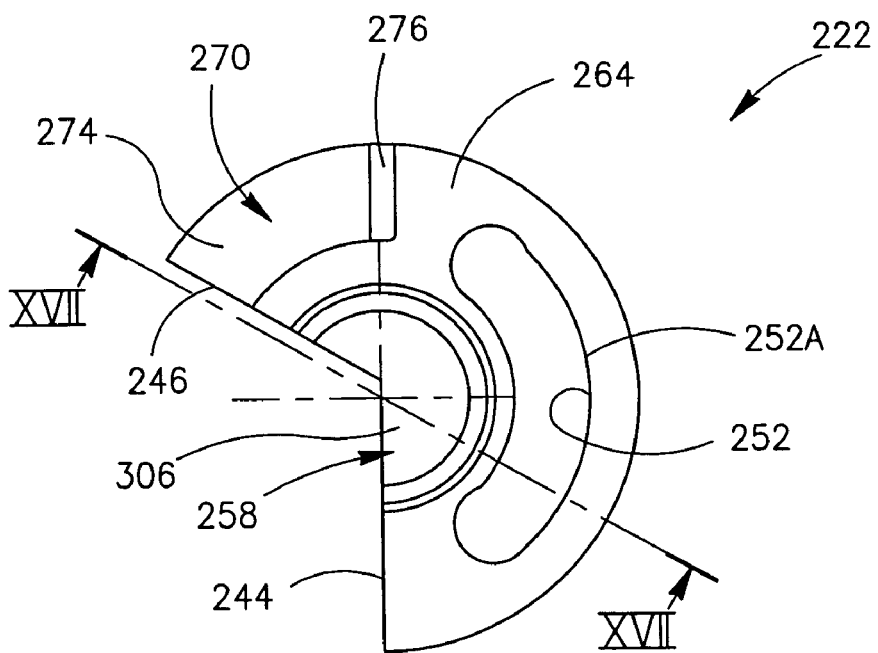
FIG. 16 is a rear view of the cutting-head shown in FIG. 15.
Figure 17:
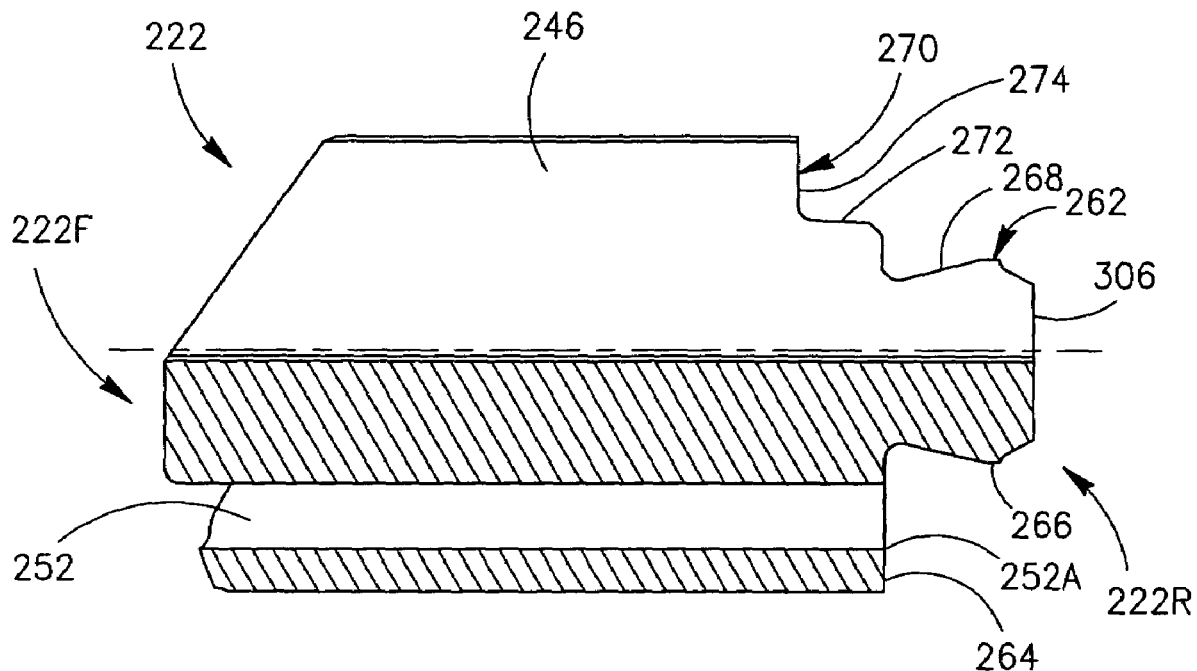
FIG. 17 is a partial cross-section view of the cutting-head taken along the line XVII-XVII in FIG. 16.

Attention is now drawn to FIGS. 15 to 17. The cutting-head 222 comprises a cutting portion 256 adjacent the cutting-head forward end $222_F$ and a cutting-head coupling portion 258 adjacent a cutting-head rear end $222_R$ thereof. A rearwardly facing cutting-head support surface 264 extends circumferentially from the cutting-head leading face 244 to the cutting-head trailing face 246 and radially inwardly from the cutting-head peripheral surface 240 to a cutting-head coupling wall 262. The cutting-head conduit inner wall 252 meets the cutting-head support surface 264 at a cutting-head conduit aperture $252_A$.

The cutting-head coupling wall 262 extends continuously circumferentially from the cutting-head leading face 244 to the cutting-head trailing face 246 and rearwardly away from the cutting-head support surface 264 towards a rearwardly facing cutting-head rear surface 306. The cutting-head coupling wall 262 comprises a rearwardly disposed cutting-head cylindrical surface 266 adjacent the cutting-head rear surface 306 and a forwardly disposed generally frustoconical cutting-head fixation surface 268 extending axially forwardly while tapering inwardly from the cutting-head cylindrical surface 266 towards the cutting-head support surface 264.

The cutting-head coupling portion 258 further comprises a cutting-head stop member 270 in a form of a recess in a rear portion of the cutting-head peripheral surface 40. The cutting-head stop member 270 is bounded by three surfaces: a generally radially outwardly facing cutting-head cylindrical wall 272, a generally axially rearwardly facing cutting-head top face 274, and a flat cutting-head stop wall 276 facing generally tangentially away from the direction of rotation R and extending generally axially forwardly from the cutting-head support surface 264 to the cutting-head top face 274 and generally radially outwardly from the cutting-head cylindrical wall 272 to the cutting-head peripheral surface 240. The cutting-head stop member 270 opens tangentially to the cutting-head trailing face 246, axially rearwardly to the cutting-head support surface 264 and radially outwardly to the cutting-head peripheral surface 240.

Figure 18:
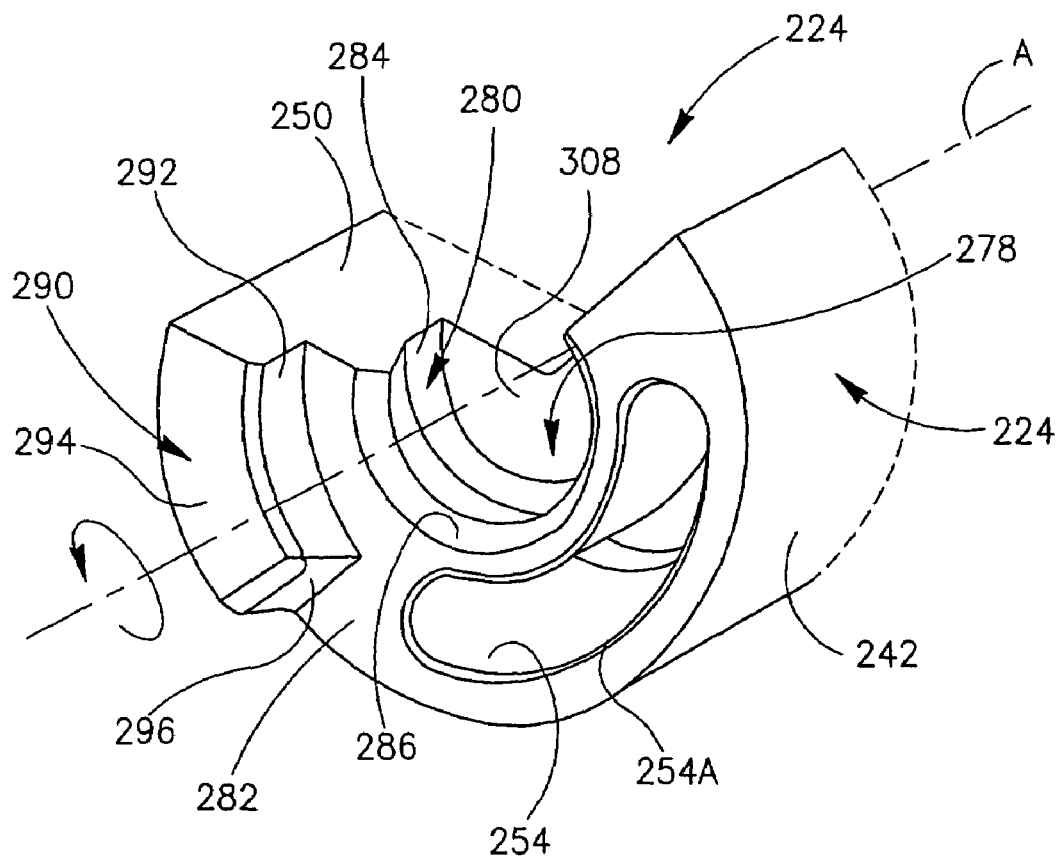
FIG. 18 is a front perspective view of the shank of the gun-drill shown in FIG. 14.
Figure 19:
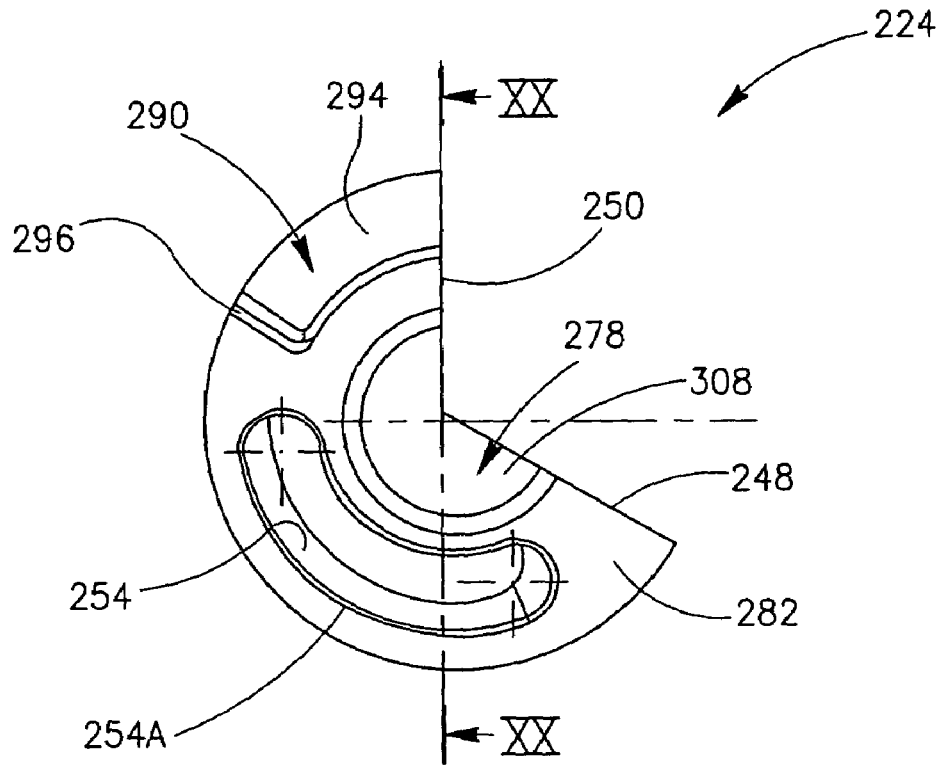
FIG. 19 is a front axial view the shank shown in FIG. 18.
Figure 20:
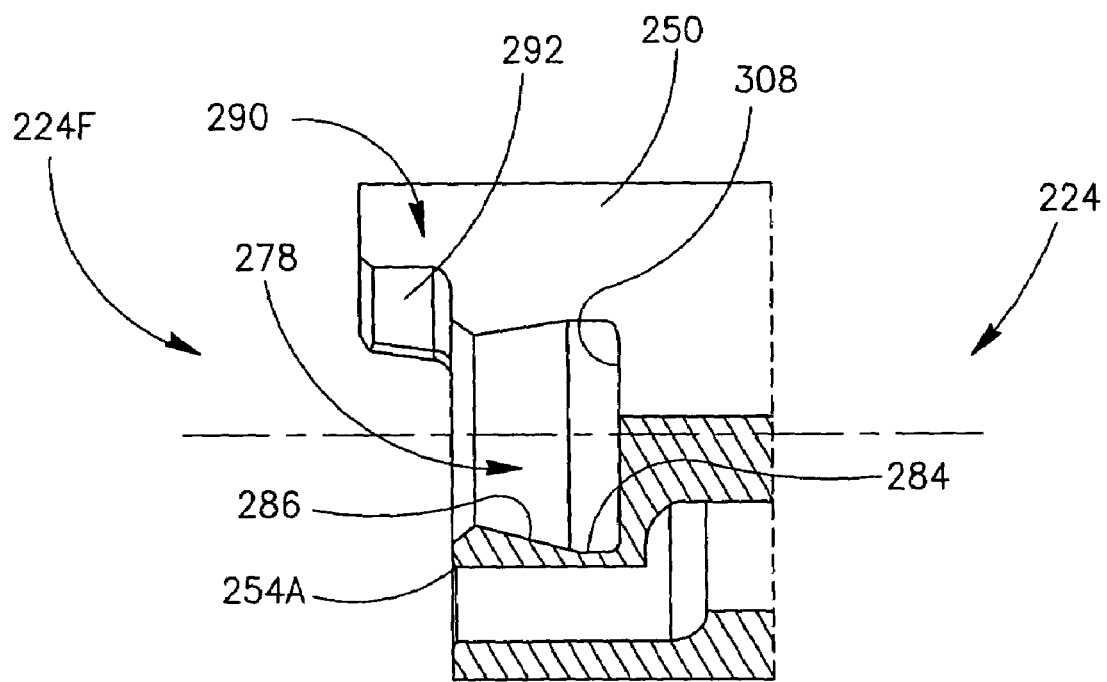
FIG. 20 is a partial cross-section view of the shank, taken along the line XX-XX in FIG. 19.

Attention is now drawn to FIGS. 18 to 20. A shank coupling portion 278 is formed at the shank forward end $224_F$ and has a shank coupling wall 280 which extends continuously circumferentially from a shank leading face 248 to a shank trailing face 250 of the flute 226 and rearwardly from a forwardly facing shank support surface 282 towards a forwardly facing shank rear surface 308. The shank conduit inner wall 254 meets the shank support surface 282 at a shank conduit aperture $254_A$.

The shank coupling wall 280 has a shank cylindrical surface 284 extending in a direction away from the shank rear surface 308, and a shank fixation surface 286 extending from the shank cylindrical surface 284 forwardly towards the shank support surface 282. A shank stop member 290 extends away from the shank support surface 282 and has a generally radially inwardly facing shank cylindrical wall 292 which extends from the shank fixation surface 286 to a forwardly facing shank top face 294. A flat shank stop wall 296 faces generally tangentially in the direction of rotation R extends generally axially forwardly from the shank support surface 282 to the shank top face 294 and generally radially outwardly from the shank cylindrical wall 292 to the shank peripheral surface 242.

Figure 21:
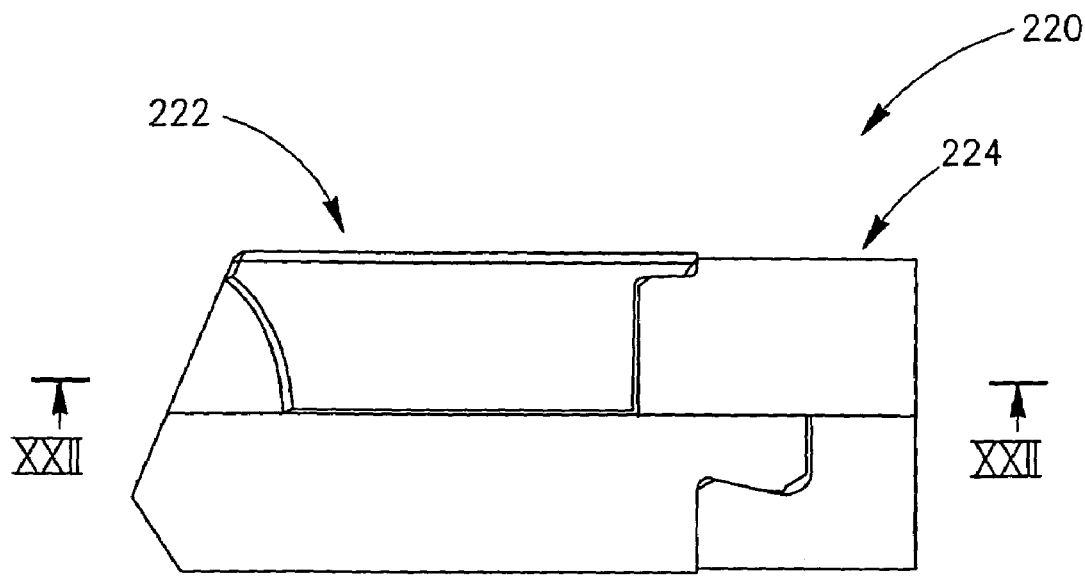
FIG. 21 is a top view of the gun-drill shown in FIG. 14, showing the cutting-head and the shank coupled in the secured position.
Figure 22:
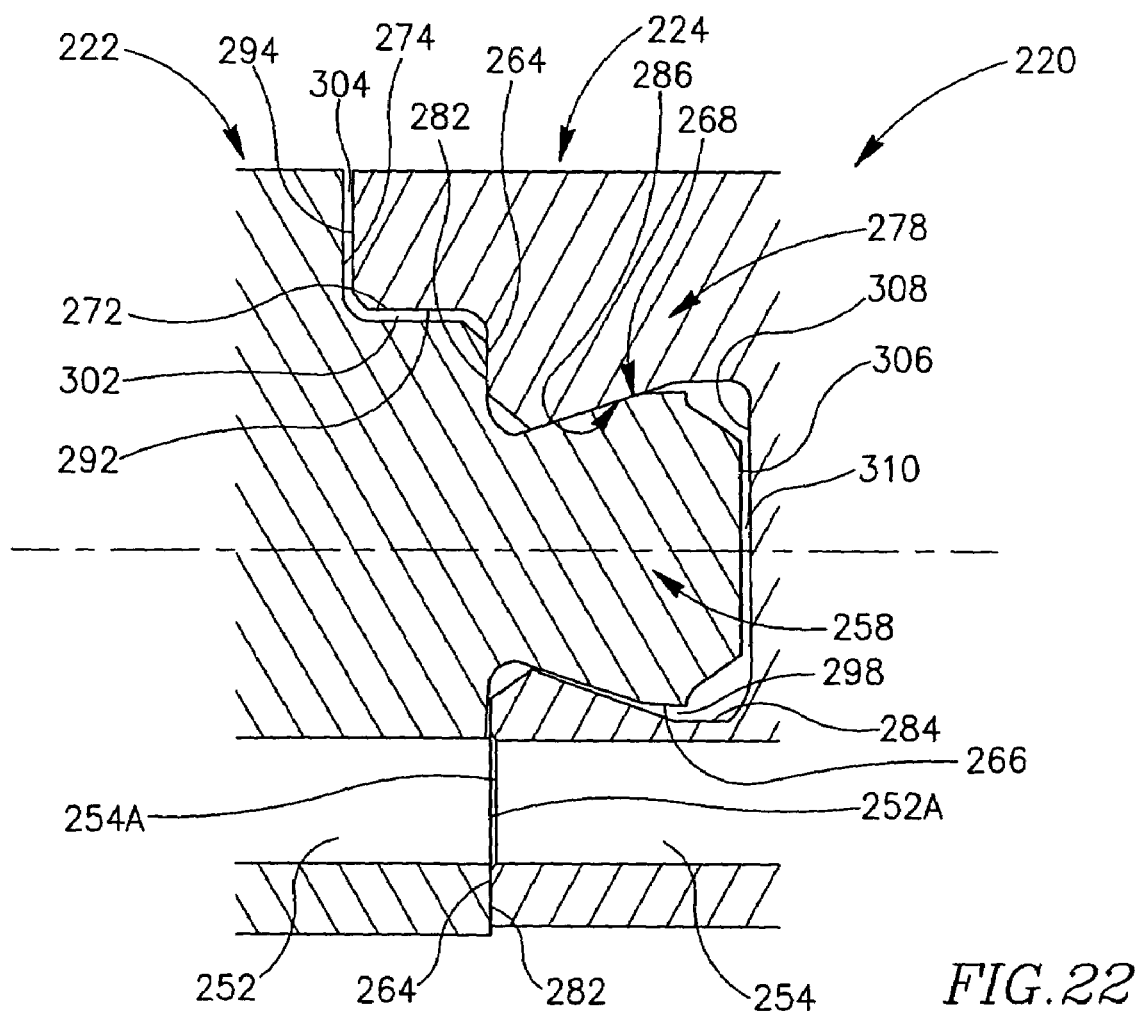
FIG. 22 is an enlarged cross-section view of the gun-drill, taken along the line XXII-XXII in FIG. 21.

Attention is now drawn to FIGS. 21 and 22. As the cutting-head 222 is rotated in the shank 224 from the released position to the secured position, the shank fixation surface 286 urges the cutting-head fixation surface 268 axially rearwardly, so that the cutting-head support surface 264 abuts the shank support surface 282, to positively and accurately position the cutting-head 222 in the shank 224. The shank conduit aperture $254_A$ and the cutting-head conduit aperture $252_A$ overlap, so that the cutting-head and shank conduit inner walls 252, 254 mate and co-align, thereby facilitating coolant flow through the shank 224 and the cutting-head 222 to the fluid discharge outlet 238. In the secured position, a first gap 298 extends circumferentially between the cutting-head cylindrical surface 266 and the shank cylindrical surface 284, a rear gap 310 exists between the cutting-head rear surface 306 and the shank rear surface 308, a third gap 302 exists between the cutting-head cylindrical wall 272 and the shank cylindrical wall 292, and a fourth gap 304 exists between the cutting-head top face 274 and the shank top face 294.

Although the present invention has been described to a certain degree of particularity, it should be understood that it is not limited to gun-drills, and that various alterations and modifications could be made without departing from the scope of the invention as hereinafter claimed.

The invention claimed is:

1. A gun-drill having a longitudinal axis of rotation A defining a front-to-rear direction and a direction of rotation R, and comprising a cutting head detachably secured to a shank;
   the cutting head comprising a cutting portion adjacent a cutting-head forward end and a cutting-head coupling portion adjacent a cutting-head rear end, the cutting-head coupling portion comprising an axially rearwardly facing cutting-head support surface and a generally frustoconical cutting-head fixation surface tapering radially inwardly while extending forwardly towards the cutting-head cutting portion;
   the shank comprising a shank coupling portion formed at a shank forward end, the shank coupling portion comprising an axially forwardly facing shank support surface and a generally frustoconical shank fixation surface tapering radially inwardly while extending forwardly towards the shank forward end; wherein
   the cutting-head fixation surface extends peripherally continuously from a cutting-head flute leading face to a cutting-head flute trailing face over a cutting-head peripheral angle $\phi C$ greater than 180°; and
   the shank fixation surface extends peripherally continuously from a shank flute leading face to a shank flute trailing face over a shank peripheral angle $\phi S$ greater than 180°;
   in a secured position, the cutting-head coupling portion and the shank coupling portion interlock co-axially, with the cutting-head support surface abutting the shank support surface; and
   cutting head and shank peripheral surfaces and cutting-head and shank flute leading and trailing faces mate and are co-aligned.

2. The gun-drill of claim 1, wherein a fluid conduit extends axially through the shank and the cutting-head, the fluid conduit comprises cutting-head and shank conduit inner walls, which are matching and aligned when the cutting-head is in the secured position in the shank.

3. The gun-drill of claim 2, wherein the cutting-head and shank conduit inner walls meet the abutting cutting-head and shank support surfaces at a cutting-head and shank conduit apertures, respectively, and wherein, in the secured position, the cutting-head and shank conduit apertures overlap.

4. The gun-drill of claim 1, wherein the cutting-head peripheral angle $\phi C$ is substantially equal to the shank peripheral angle $\phi S$.

5. The gun-drill of claim 4, wherein the cutting-head peripheral angle $\phi C$ and the shank peripheral angle $\phi S$ are smaller than 270°.

6. The gun-drill of claim 4, wherein the cutting-head peripheral angle $\phi C$ and the shank peripheral angle $\phi S$ are between 220° and 250°.

7. The gun-drill of claim 4, wherein the cutting-head peripheral angle $\phi C$ and the shank peripheral angle $\phi S$ are 235°.

8. The gun-drill of claim 1, wherein the cutting-head and the shank support surfaces are flat.

9. The gun-drill of claim 8, wherein the cutting-head and the shank support surfaces are perpendicular to the axis of rotation A.

10. The gun-drill of claim 1, wherein the cutting-head coupling portion comprises a cutting-head cylindrical surface extending axially away from the cutting-head fixation surface and peripherally continuously from the cutting-head leading face to the cutting-head trailing face, and
    the shank coupling portion comprises a shank cylindrical surface extending axially away from the shank fixation surface and peripherally continuously from the shank leading face to the shank trailing face.

11. The gun-drill of claim 10, wherein in the secured position a first gap extends continuously circumferentially between the cutting-head cylindrical surface and the shank cylindrical surface.

12. The gun-drill of claim 1, wherein:
    the cutting-head coupling portion comprises a cutting-head stop member having a cutting-head stop wall facing away from the direction of rotation R and extending generally axially forwardly away from the cutting-head fixation surface; and
    the shank coupling portion comprises a shank stop member having a shank stop wall facing the direction of rotation R and extending generally axially forwardly away from the shank fixation surface.

13. The gun-drill of claim 12, wherein in the secured position the cutting-head stop wall and the shank stop wall abut.

14. The gun-drill of claim 12, wherein
    the cutting-head stop member comprises a generally radially outwardly facing cutting-head cylindrical wall and an axially rearwardly facing cutting-head top face, and
    the shank stop member comprises a generally radially inwardly facing shank cylindrical wall and an axially forwardly facing shank top face.

15. The gun-drill of claim 14, wherein in the secured position a third gap exists between the cutting-head cylindrical wall and the shank cylindrical wall.

16. The gun-drill of claim 14, wherein in the secured position a fourth gap exists between the cutting-head top face and the shank top face.

17. The gun-drill of claim 1, wherein
    an axially rearwardly facing cutting-head intermediate surface is located between the cutting-head fixation surface and the cutting-head peripheral surface, and
    an axially forwardly facing shank intermediate surface is located between the shank fixation surface and the shank peripheral surface.

18. The gun-drill of claim 17, wherein a second gap exists between the cutting-head intermediate surface and the shank intermediate surface.

19. The gun-drill of claim 1, wherein in the secured position, a rear gap exists between a generally axially rearwardly facing cutting-head rear surface disposed adjacent the cutting-head cylindrical surface and a generally axially forwardly facing shank rear surfaces disposed adjacent the shank cylindrical surface.

20. A replaceable cutting-head for mounting on a shank of a gun-drill having an axis of rotation A and comprising a cutting-head peripheral surface, a cutting-head cutting portion adjacent a cutting-head forward end, a cutting-head coupling portion adjacent a cutting-head rear end, and an axially extending flute having cutting-head leading and trailing faces extending generally radially to the cutting-head peripheral surface;
    the cutting-head coupling portion comprising an axially rearwardly facing cutting-head support surface, and a cutting-head coupling wall extending axially rearwardly away from the cutting portion and peripherally continuously from the cutting-head leading face to the cutting-head trailing face over a peripheral cutting-head angle $\phi C$ of greater than 180°;
    the cutting-head coupling wall comprises a rearwardly disposed cutting-head cylindrical surface extending forwardly to a cutting-head fixation surface that extends axially forwardly while tapering radially inwardly, adjacent the cutting-head cutting portion.

21. The cutting-head of claim 20, wherein a cutting-head stop member extends axially forwardly away from the cutting-head coupling wall to the cutting-head cutting portion adjacent the cutting-head trailing face.

22. The cutting-head of claim 21, wherein the cutting-head stop member opens tangentially forwardly to the cutting-head trailing face.

23. The cutting-head of claim 21, wherein the cutting-head stop member opens radially outwardly to the cutting-head peripheral surface.

24. The cutting-head of claim 21, wherein the cutting-head stop member comprises a generally axially rearwardly facing cutting-head top face, a generally radially outwardly facing cutting-head cylindrical wall, and a cutting-head stop wall extending away from the cutting-head coupling portion to the cutting-head top face, and from the cutting-head cylindrical wall to the cutting-head peripheral surface.

25. The cutting-head of claim 21, wherein an axially rearwardly facing cutting-head intermediate surface is located between the cutting-head fixation surface and the cutting-head peripheral surface, and the cutting-head support surface is located at the cutting-head rear end adjacent the cutting-head cylindrical surface.

26. The cutting-head of claim 21, wherein the cutting-head support surface is located between the cutting-head fixation surface and the cutting-head peripheral surface, and a generally axially rearwardly facing cutting-head rear surface is located at the cutting-head rear end adjacent the cutting-head cylindrical surface.

27. A method of assembling a gun-drill comprising a cutting-head and a shank, the gun-drill having a longitudinal axis of rotation A extending centrally therealong and defining a front-to-rear direction and a direction of rotation R, and comprising cutting head and shank peripheral surfaces and cutting-head and shank flute leading and trailing faces;

the shank comprises a shank coupling portion formed at a shank front end and comprising a shank fixation surface that extends axially forwardly while tapering radially inwardly, and a shank cylindrical surface extending rearwardly of the shank fixation surface and an axially forwardly facing shank support surface, the shank fixation surface and the shank cylindrical surface extending peripherally continuously from a shank leading face to a shank trailing face along an angle $\phi S$ greater than 180°;

the cutting-head having a cutting portion adjacent a cutting-head forward end and a cutting-head coupling portion adjacent a cutting-head rear end, the cutting-head coupling portion comprising a cutting-head fixation surface that extends axially forwardly while tapering radially inwardly, a cutting-head cylindrical surface extending rearwardly of the cutting-head fixation surface and a rearwardly facing cutting-head support surface, the cutting-head fixation surface and the cutting-head cylindrical surface extending peripherally continuously from a cutting-head leading face to a cutting-head trailing face along an angle $\phi C$ greater than 180°;

the method comprising the steps of:

positioning the cutting-head and the shank with the cutting-head leading face facing the shank trailing face;

slidably inserting the cutting-head coupling portion into the shank coupling portion until a contact is formed between the cutting-head fixation surface and the shank fixation surface; and rotating the cutting-head relative to the shank in a direction opposed to the direction of rotation R until the cutting-head fixation surface abuts the shank fixation surface and cutting head and shank peripheral surfaces and cutting-head and shank flute leading and trailing faces co-align.

28. The method according to claim 27, wherein:

the shank further comprises a shank stop member having a shank stop wall generally facing the direction of rotation R;

the cutting head further comprises a cutting-head stop member having a cutting-head stop wall generally facing away from the direction of rotation R; and the cutting-head is rotated relative to the shank in a direction opposed to the direction of rotation R until the cutting-head stop wall abuts the shank stop wall.

* * * * *